(No Model.)
R. FITZGERALD.
MACHINE FOR CUTTING HOLES THROUGH ICE.
No. 286,599. Patented Oct. 16, 1883.
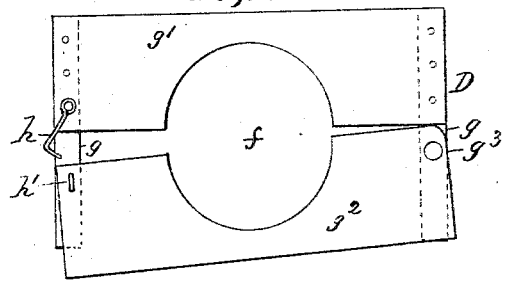
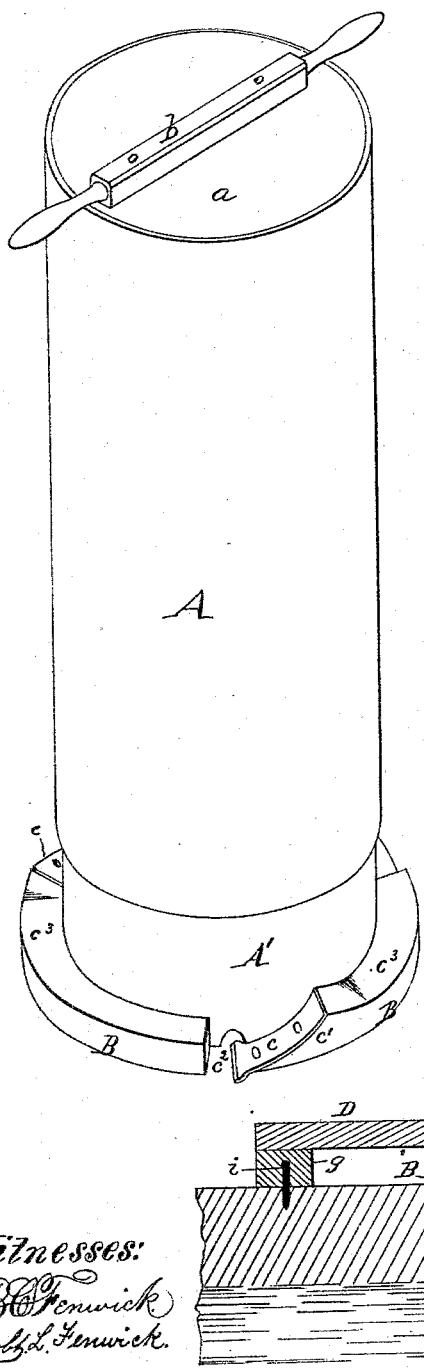
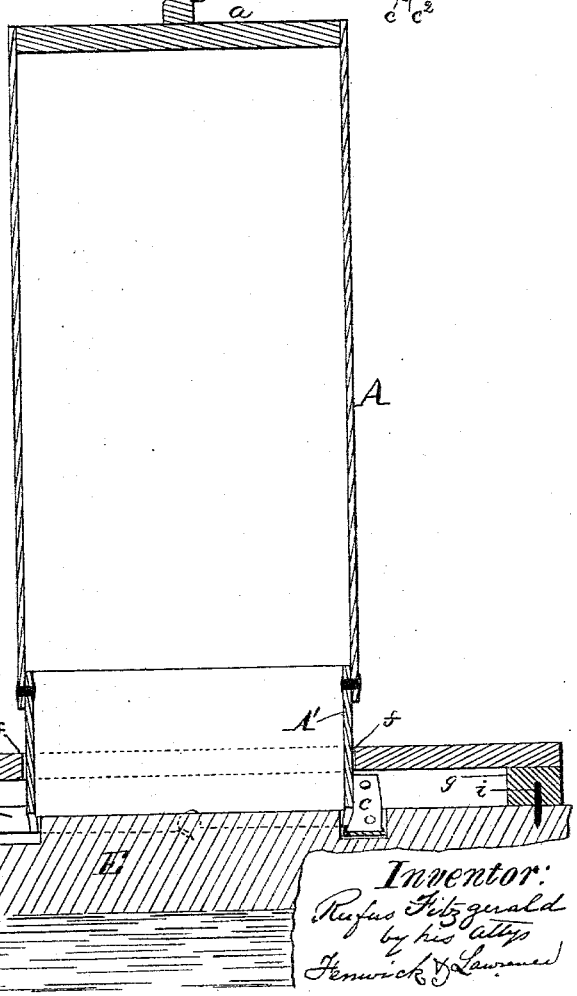
Witnesses:
B. H. Fenwick
Roll L. Fenwick
Inventor:
Rufus Fitzgerald
by his attys
Fenwick & Lawrence

UNITED STATES PATENT OFFICE.

RUFUS FITZGERALD, OF NASHUA, NEW HAMPSHIRE.

MACHINE FOR CUTTING HOLES THROUGH ICE.

SPECIFICATION forming part of Letters Patent No. 286,599, dated October 16, 1883.

Application filed July 30, 1883. (No model.)

*To all whom it may concern:*

Be it known that I, RUFUS FITZGERALD, a citizen of the United States, residing at Nashua, in the county of Hillsborough and State of New Hampshire, have invented a new and Improved Machine for Cutting Holes Through Ice; and I do hereby declare that the following is a full, clear, and exact description thereof, reference being had to accompanying drawings, forming a part of this my specification of said invention, in which drawings—

Figure 1 is a perspective view of my improved machine for cutting holes through ice, its guiding-platform (shown in section in Fig. 2) being removed. Fig. 2 is a central vertical section of Fig. 1 and a longitudinal section of the guiding-platform shown in plan view in Fig. 4, the whole being shown in working position for the purpose of cutting a hole through ice. Fig. 3 is an inverted plan view of the lower or cutting end of the machine, and Fig. 4 a plan view of the guiding-platform shown in section and in working position in Fig. 2.

The object of my invention is to afford a ready means for cutting holes through ice on lakes, rivers, and other bodies of water, through which persons can fish while such bodies of water are frozen over. Heretofore an ax has usually been employed for such purpose; but when the ice is thick it is exceedingly difficult to cut a proper hole through the ice with such implement, while at the same time the blows of the ax scare away the fish from the vicinity of the hole being cut, and the water in the hole is full of broken ice, which is removed with difficulty.

In the figures, A indicates a cylinder of thin metal, closed at its upper end by a wooden disk, $a$, fixedly applied in position, as shown, to the cylinder, and provided with a handle, as $b$, whereby the operator may utilize both hands during the act of rotating the cylinder to cut a hole through the ice, as indicated in Fig. 2. A' indicates a short cylinder of heavier sheet metal, secured to A, as shown, suitable for sustaining circularly-formed stocks B, to which cutting-blades $c$ are applied, firmly in position. The blades $c$ are curved, as shown, and seated upon a correspondingly-curved and thickened portion, as $c'$, of the blade-stocks B, such curvature tending to facilitate the passage of the ice away from and in rear of the cutting-edge of the blades $c$ during the act of cutting the hole. As represented, the blade-stocks B are of sufficient length to nearly surround the cylinder A', leaving only a mouth or space, as $c^2$, between the rearward termination of one stock and the cutting-edge of the cutting-blade upon an adjacent stock; and by this means the cylinder A' is not only strengthened, but a full bearing of the stocks B is had upon the ice in the act of cutting, thereby giving steadiness of action to the machine while in use, the lower surfaces of said stocks being made broad and exactly flush with the lower end of the cylinder A'. The stocks B, as will be seen, are made with curved depressed surfaces $c^3$ in rear of the cutters $c$, and thus facilitate the occasional clearing away accumulated masses of the cut ice by lifting it from the hole for clearance. As shown, the stocks B are applied to the cylinder A' outside thereof, and by this means the comminuted or cut ice can readily be removed from around the cylinder A', when required, without withdrawing the machine from its work for such purpose.

D indicates a steadying-platform, consisting of end cross-pieces, $g\ g$, and planks $g'\ g^2$, the plank $g'$ being nailed to the cross-pieces $g\ g$, as indicated in Fig. 4, while the plank $g^2$ is pivotally attached at $g^3$ to one of the cross-pieces $g$. This platform is cut away centrally, so as to form a circular opening, $f$, of a size to receive the cylinder A' when set therein, as indicated in Fig. 2, in which position the planks $g'\ g^2$ are held closed by the hook $h$ and eye $h'$. The cross-pieces $g\ g$ of the platform D are provided with short pins, as $i\ i$, which pierce the ice when the operator stands upon the platform to operate the machine, and thus the platform is kept steady during such act, the platform, when in position as shown in Fig. 2, serving to properly hold, steady, and guide the cylinder, cutter-stocks, and cutter-blades to their work, especially during the early stage of cutting the hole through the ice E. The platform may be removed from around the cylinder A' after, by the rotating thereof, a circular channel a few inches in depth has been cut in the ice, thus affording easy access to the channel for removing the chips of cut ice, so as not to leave any in the water after the hole has been cut and the ice-block removed.

The stocks B might be placed inside the cylinder, and the accumulation of ice-chips thus thrown inside the cylinders A A'; but the outside arrangement of the stocks is preferable, as the ice-chips would have to be removed from the cylinders by entirely removing the ice-hole cutter and giving it a smart tap upon the solid ice-bed.

Instead of employing the special platform described, a block of wood may be used with a hole in it large enough to admit the stocks and cutters.

What I claim as my invention, and desire to secure by Letters Patent, is—

1. In a machine for cutting holes through ice, a cylinder provided with means whereby it may be rotated, and with curved cutter-stocks B, having cutting-blades and depressed surfaces $c^3$ in rear of the blades, substantially as and for the purpose described.

2. Cylinder A', provided with cutter-stocks and cutting-blades, the cutting-stocks having their under surface flush with the lower end of the cylinder, and affording around the cylinder a continuous bearing upon the ice in the act of use, except at the point of delivery of the cut ice upon the cutter blades and stocks, substantially as and for the purpose described.

3. The platform D, in combination with cylinder A', provided with cutting-blades, whereby the cylinder and its cutting-blades are held in working position in the act of cutting a hole through ice, substantially as described.

RUFUS FITZGERALD.

Witnesses:
   H. A. CUTTER,
   EDWARD S. CUTTER.